(12) United States Patent
Zhang et al.

(10) Patent No.: US 11,410,622 B2
(45) Date of Patent: Aug. 9, 2022

(54) DISPLAY METHOD AND DEVICE, AND STORAGE MEDIUM

(71) Applicant: Beijing Xiaomi Mobile Software Co., Ltd., Beijing (CN)

(72) Inventors: Yuan Zhang, Beijing (CN); Guilin Zhong, Beijing (CN); Haining Huang, Beijing (CN); Dong Zhai, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/147,909

(22) Filed: Jan. 13, 2021

(65) Prior Publication Data
US 2021/0366420 A1    Nov. 25, 2021

(30) Foreign Application Priority Data
May 22, 2020  (CN) .......................... 202010440335.0

(51) Int. Cl.
*G09G 3/36* (2006.01)
*G09G 5/10* (2006.01)
*G09G 5/02* (2006.01)
*G06T 11/00* (2006.01)

(52) U.S. Cl.
CPC ............. *G09G 3/3607* (2013.01); *G09G 5/10* (2013.01); *G09G 2320/0626* (2013.01); *G09G 2320/0666* (2013.01)

(58) Field of Classification Search
CPC combination set(s) only.
See application file for complete search history.

(56) References Cited

U.S. PATENT DOCUMENTS

| | | | |
|---|---|---|---|
| 6,130,968 A | 10/2000 | McIan et al. | |
| 6,577,762 B1* | 6/2003 | Seeger | G06K 9/38 382/173 |
| 8,264,499 B1 | 9/2012 | Landry et al. | |
| 8,345,061 B1 | 1/2013 | Landry et al. | |
| 2002/0113801 A1 | 8/2002 | Reavy et al. | |
| 2006/0230414 A1* | 10/2006 | Zhang | G11B 27/22 725/17 |

(Continued)

FOREIGN PATENT DOCUMENTS

| | | |
|---|---|---|
| CN | 111090482 A | 5/2020 |
| JP | 2016-118756 A | 6/2016 |

(Continued)

OTHER PUBLICATIONS

"A mechanism to improve the user experience of online reading", An IP.com Prior Art Database Technical Disclosure, IP.com, Sep. 15, 2014, 8 pages.

(Continued)

*Primary Examiner* — Wesner Sajous
(74) *Attorney, Agent, or Firm* — Finnegan, Henderson, Farabow, Garrett & Dunner, L.L.P.

(57) ABSTRACT

A display method is applied to electronic equipment including a display assembly. A display content displayed by the display assembly includes a background and an object for reading located on the background. The display method includes: differentiating grayscales of background pixels of the background; and displaying the background based on the background pixels with the differentiated grayscales, and displaying the object for reading.

20 Claims, 15 Drawing Sheets

(56) References Cited

U.S. PATENT DOCUMENTS

| | | | |
|---|---|---|---|
| 2007/0237363 A1* | 10/2007 | Hagio | G01S 17/36 |
| | | | 382/106 |
| 2010/0278436 A1* | 11/2010 | Tsai | G06K 9/3258 |
| | | | 382/209 |
| 2012/0293528 A1 | 11/2012 | Larsen | |
| 2014/0285477 A1 | 9/2014 | Cho et al. | |
| 2015/0117791 A1* | 4/2015 | Mertens | H04N 19/625 |
| | | | 382/239 |

FOREIGN PATENT DOCUMENTS

| | | |
|---|---|---|
| JP | 2017162153 A | 9/2017 |
| JP | 2017-182497 A | 10/2017 |

OTHER PUBLICATIONS

Extended European Search Report in European Application No. 20216616.1, dated Jun. 23, 2021.
Notice of Reasons for Refusal dated Nov. 30, 2021, from the Japanese Patent Office issued in counterpart Japanese Application No. 2020-195695.
Notice of Reasons for Refusal in Japanese Application No. 2020-195695, dated Jun. 28, 2022.

\* cited by examiner

| adjustment / pixel value | -1 | 0 | 0 | 2 | 1 | 3 | 0 | 1 | -1 | -2 | -3 | -3 | 0 | -1 | -1 | 2 | 1 | 2 | 1 | 0 | -1 | 4 |
|---|---|---|---|---|---|---|---|---|---|---|---|---|---|---|---|---|---|---|---|---|---|---|
| red | 205 | 206 | 206 | 208 | 207 | 209 | 206 | 207 | 205 | 204 | 203 | 203 | 206 | 205 | 205 | 208 | 207 | 208 | 207 | 206 | 207 | 210 |
| green | 199 | 200 | 200 | 202 | 201 | 203 | 200 | 201 | 199 | 198 | 197 | 197 | 200 | 199 | 199 | 202 | 201 | 202 | 201 | 200 | 201 | 204 |
| blue | 189 | 190 | 190 | 192 | 191 | 193 | 190 | 191 | 189 | 188 | 187 | 187 | 190 | 189 | 189 | 192 | 191 | 192 | 191 | 190 | 191 | 194 |

FIG. 2

DISPLAY METHOD AND DEVICE, AND STORAGE MEDIUM

CROSS-REFERENCE TO RELATED APPLICATIONS

This application is based on and claims priority to Chinese Application No. 202010440335.0 filed on May 22, 2020, the content of which is hereby incorporated by reference in its entirety.

BACKGROUND

With rapid development of information technology, various electronic equipment has brought great convenience to life. To facilitate human-computer interaction, most existing electronic equipment may be provided with a display assembly configured to display various sorts of multimedia information. For example, information such as a picture, text, etc., may be displayed based on a display assembly of electronic equipment.

For example, the electronic equipment may be a mobile phone. In a reading scene of the mobile phone, a background and an object for reading located on the background may be displayed through a display of the mobile phone. However, a visual effect provide by the mobile phone may need to be improved, and watching the display for a long time may also lead to visual fatigue, or even decreased vision of the user.

SUMMARY

According to a first aspect of embodiments of the present disclosure, a display method is applied to electronic equipment including a display assembly. A display content displayed by the display assembly includes a background and an object for reading located on the background. The display method includes: differentiating grayscales of background pixels of the background; and displaying the background based on the background pixels with the differentiated grayscales, and displaying the object for reading.

According to a second aspect of embodiments of the present disclosure, electronic equipment includes a processor; a memory configured to store instructions executable by the processor; and a display assembly. A display content displayed by the display assembly includes a background and an object for reading located on the background. The processor is configured to: differentiate grayscales of background pixels of the background; and display the background based on the background pixels with the differentiated grayscales, and display the object for reading.

According to a third aspect of embodiments of the present disclosure, a non-transitory computer-readable storage medium has stored therein instructions that, when executed by a processor of electronic equipment including a display assembly, cause the electronic equipment to perform the display method according to the first aspect.

The above general description and elaboration below are exemplary and explanatory, and do not limit the disclosure.

BRIEF DESCRIPTION OF THE ACCOMPANYING DRAWINGS

The accompanying drawings are incorporated in and constitute part of the disclosure, illustrate embodiments according to the disclosure, and together with the description, serve to explain the principle of the disclosure.

FIG. 2 is a diagram of computing differentiated target RGB values according to an exemplary embodiment.

DETAILED DESCRIPTION

Figure 1:
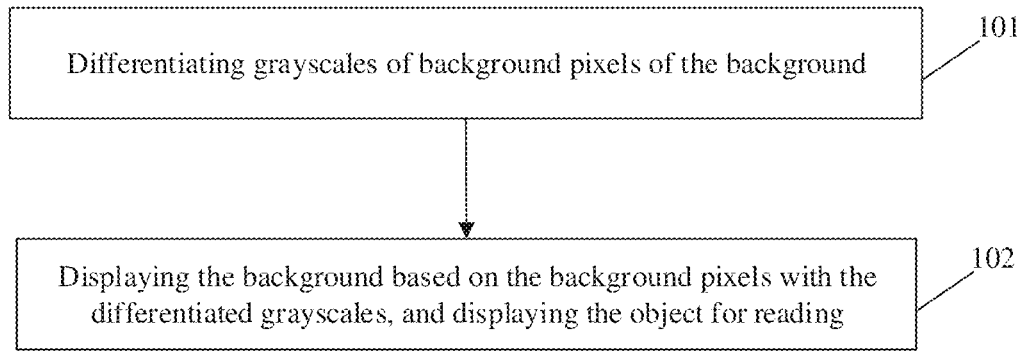
FIG. 1 is a flowchart of a display method according to an exemplary embodiment.

Reference will now be made in detail to exemplary embodiments, examples of which are illustrated in the accompanying drawings. The following description refers to the accompanying drawings, in which identical or similar elements in different drawings are denoted by identical reference numerals unless indicated otherwise. Implementations set forth in the following exemplary embodiments do not represent all implementations in accordance with the disclosure. Rather, they are merely examples of apparatuses and methods consistent with aspects of the disclosure as recited in the appended claims.

FIG. 1 is a flowchart of a display method according to an exemplary embodiment. For example, the method is applied to electronic equipment including a display assembly. A display content displayed by the display assembly may include a background and an object for reading located on the background. The method may include the following steps.

In step 101, grayscales of background pixels of the background are differentiated.

In step 102, the background is displayed based on the background pixels with differentiated grayscales, and the object for reading is displayed.

The display method herein may be applied to electronic equipment including a display assembly. The electronic equipment may include a mobile terminal, a fixed terminal, etc. The mobile terminal may include a mobile phone, a notebook computer, a tablet computer, wearable electronic equipment, a smart speaker, etc. The fixed terminal may include a personal computer, a television, etc.

In an embodiment, a set picture may be displayed through the display assembly in the electronic equipment. For example, an object for reading may be displayed based on the display assembly of the electronic equipment. The object for reading may include a picture and/or a text. When the object for reading is displayed on the display assembly, it may be determined that the electronic equipment is in a reading scene.

In an embodiment, a picture displayed by the display assembly may be analyzed using a deep learning network model, determining a background and an object for reading, respectively. The deep learning network model may include a neural network model, etc. When it is determined that the object for reading is text, the object for reading may be recognized based on an optical character recognition (OCR) model. The background and the object for reading may be acquired by segmenting the picture displayed by the display assembly.

When it is determined that the electronic equipment is in a reading scene, the background and the object for reading that is located on the background may be determined based on the picture being displayed by the display assembly. For example, grayscales of background pixels of the background may be differentiated. A grayscale of a background pixel may be acquired according to RGB values of the background pixel. The RGB values may be assigned by a processor of the electronic equipment when the background pixel of the background is digitalized. RGB values may represent information on average brightness of the background pixels of the background, or information on an average reflection (transmission) density of the background pixels. For example, when a pixel is expressed by 8 bits, the pixel may have a total of 256 gray scales with a grayscale being from 0 to 255. When a pixel is expressed by 12 bits, the pixel may have a total of 4,096 gray scales. When a pixel is expressed by 16 bits, the pixel may have a total of 65,536 gray scales. The number of bits may indicate the number of binary bits to be used in a bitmap to express the color of a pixel. For example, a pixel may be expressed by 8 bits in the embodiment.

In an embodiment, an effect of display with diffusion reflection shown by the background may be determined according to current grayscales of the background pixels. For example, if the current grayscales of the background pixels in the background are the same, it may be determined that the background is showing an effect of display with no diffusion reflection. If differences among the current grayscales of respective background pixels are less than a set difference, it may be determined that the background is showing an effect of display with weak diffusion reflection. If differences among the current grayscales of respective background pixels are no less than the set difference, it may be determined that the background is showing an effect of display with strong diffusion reflection.

When the background is showing an effect of display with no diffusion reflection, the grayscales may be differentiated by setting the differences among the respective grayscales as a first set grayscale threshold.

When the background is showing the effect of display with weak diffusion reflection, the grayscales may be differentiated by setting the differences among the respective grayscales as a second set grayscale threshold. The second set grayscale threshold may be less than the first set grayscale threshold.

When the background is showing the effect of display with strong diffuse reflection, the differences among the respective grayscales may be set as a third set grayscale threshold. The third set grayscale threshold may be less than the second set grayscale threshold.

After the grayscales have been differentiated, the background may be displayed based on the background pixels with differentiated grayscales. The object for reading located on the background may be displayed. For example, when the background is showing an effect of display with no diffusion reflection, an effect of display with diffusion reflection may be simulated by differentiating grayscales of background pixels. When the background is showing an effect of display with weak diffusion reflection, the current effect of display with diffusion reflection may be strengthened by differentiating grayscales of background pixels.

In the embodiments, when the electronic equipment is in a reading scene, grayscales of background pixels of the background may be differentiated. Then, the background may be displayed based on the background pixels with differentiated grayscales. The object for reading located on the background may be displayed. Accordingly, grayscales of the background pixels are rendered different from each other, thereby simulating an effect of diffuse reflection by a paper book, simulating an experience of a paper book based on the display assembly of the electronic equipment. With differentiated grayscales, visual fatigue and decreased vision of the user caused by mirror reflection may be reduced, thereby improving reading experience.

In an embodiment, the method may further include: grayscales of background pixels of the background and grayscales of reading pixels of the object for reading that is located on the background are differentiated simultaneously.

In an embodiment, grayscales of the background pixels may be differentiated first. Then, grayscales of the reading pixels may be differentiated. In an embodiment, grayscales of the reading pixels may be differentiated first. Then, grayscales of the background pixels may be differentiated. There is no limit on the execution sequence, as long as the background and the object for reading are made to present an effect of display with diffusion reflection.

In an embodiment, grayscales of reading pixels may be differentiated by performing randomization processing on reading pixels with identical grayscales to acquire differentiated grayscales. The differentiation processing may be performed on both the background and the object for reading, allowing a picture formed by both the background and the object for reading to present an effect of diffuse reflection. Compared to differentiation performed on only the background or only the object for reading, a final picture is rendered more realistic and natural. In addition, compared to processing the background and the object for reading respectively, performing differentiation processing on the background and the object for reading simultaneously improves processing efficiency.

In an embodiment, grayscales of the background pixels of the background may be differentiated by performing randomization processing on background pixels with identical grayscales to acquire background pixels with differentiated grayscales.

In an embodiment, before performing randomization processing on the background pixels with identical grayscales, a number of the background pixels with identical grayscales may be determined. It may be determined whether the number of the background pixels with identical grayscales is no less than a set number threshold. When the number of the background pixels with identical grayscales is no less than the set number threshold, randomization processing may be performed on the background pixels with identical grayscales, to acquire background pixels with differentiated grayscales.

For example, the background pixels may be of a single color of white or black. The background of the single color may be displayed, thereby rendering a visual effect similar to mirror reflection. However, a visual effect that helps protecting eyesight may be a background of different shades of white or of different shades of black. In an embodiment, random differentiation processing may be performed on background pixels, to acquire differentiated grayscales and render the grayscales of the background pixels different, thereby achieving an effect of display with diffusion reflection.

When the number of the background pixels with identical grayscales is less than the set number threshold, the grayscales of the background pixels of the background may be kept unchanged. When there are a small number of background pixels with identical grayscales, there may be no significant impact on the effect of display with diffusion reflection. For example, when there are two background pixels with identical grayscales, there may basically be no impact on the effect of display with diffusion reflection. In such a case, it may be unnecessary to perform randomization processing on the two background pixels.

Compared to performing differentiation processing in a fixed manner, differentiation processing is performed on background pixels with identical grayscales randomly in the embodiments, rendering the effect of display with diffusion reflection closer to that of real display, improving reading experience.

In some embodiments, an effect of diffuse reflection may be achieved by differentiating grayscales by acquiring a predetermined diffuse reflection model simulating an effect of diffuse reflection in a distinct light environment. Grayscales of the background pixels may be adjusted according to the diffuse reflection model, thereby acquiring the background pixels with the differentiated grayscales. For example, the diffuse reflection model may be of a ceiling light, a desk lamp, sunlight, etc. The electronic equipment may select a proper diffuse reflection model according to a current light environment, and perform non-random differentiation processing to acquire an effect of diffuse reflection close to that achieved with a physical paper page in a distinct scene, thereby improving reading experience and protecting eyesight of the user.

In an embodiment, grayscales of the background pixels of the background may be differentiated by increasing or decreasing a grayscale of each of the background pixels based on a random value in a preset range.

In the embodiment, the random value may be randomly selected from a preset range. A grayscale of each background pixel may be increased or decreased based on the random value, acquiring background pixels with differentiated grayscales.

In an embodiment, multiple random values in the preset range may be set. A preset random sequence may be formed based on the multiple random values. The preset range may be a range no less than a second set threshold and no greater than a first set threshold. As grayscales differentiation with a random value greater than the first set threshold or less than the second set threshold may lead to an unnatural effect of diffuse reflection, it may be specified that the random value be in the preset range. The first set threshold may be 6. The second set threshold may be −6. The first set threshold and the second set threshold may also be set as needed. For example, the first set threshold may be 13, and the second set threshold may be 0, etc., to which no limit is made herein.

In an embodiment, the preset range may be (−a, a). The a may be a positive number no less than 6 and no greater than 13. When the random value is in the preset range, a better effect of diffuse reflection may be achieved.

In an embodiment, differentiation processing may be performed on the grayscale of a background pixel in the background by processing the grayscale with a random value selected randomly from the preset random sequence, thereby acquiring a grayscale that has been subject to differentiation processing. In the embodiment, a sum of the grayscale and the randomly determined random value may be computed to acquire the grayscale having been subject to differentiation processing. For example, if there are M background pixels in the background, sums of M grayscales of the M background pixels and M random values that are randomly determined may be computed respectively, acquiring M differentiated grayscales. The M may be a positive integer.

For example, there may be a first background pixel, a second background pixel, . . . , and an Mth background pixel in the background. A first grayscale of the first background pixel may be 206. A second grayscale of the second background pixel may be 188, etc. An Mth grayscale of the Mth background pixel may be 160. A first random value randomly determined for the first background pixel may be −1. A second random value randomly determined for the second background pixel may be −2, etc. An Mth random value randomly determined for the Mth background pixel may be 1. The grayscales may be differentiated by determining a first sum 205 of the first grayscale and the first random value, a second sum 186 of the second grayscale and the second random value, . . . , and an Mth sum 161 of the Mth grayscale and the Mth random value, respectively. Then, the first sum, second sum, . . . , and the Mth sum as determined may be the differentiated grayscales.

In an embodiment, a random value is specified to be within a preset numerical range, reducing a probability of an effect of diffuse reflection being unnatural due to differentiated grayscales being excessive deviated from each other, rendering an effect of display with diffusion reflection closer to that of real display, improving reading experience.

In an embodiment, the grayscales of the background pixels may be differentiated by dividing the background into one or more blocks of a preset size. Grayscales of background pixels of each of the one or more blocks may be differentiated, until grayscales of all of the background pixels in the background have been differentiated.

For example, the background may be divided into one or more 64×64 blocks. After the blocks are acquired, grayscales of background pixels of each block may be differentiated, until grayscales of all of the background pixels in the background have been differentiated. The differentiation processing may be performed on a block by sequentially scanning each of the pixels. It may be determined whether the pixel is a background pixel. When the pixel is a background pixel, differentiation processing may be performed on the grayscale of the pixel. When the pixel is not a background pixel, the grayscale of the pixel may be kept unchanged.

When the pixel is not a background pixel, it may be determined whether the pixel is a reading pixel of the object for reading. When the pixel is a reading pixel, a color value of the pixel may be adjusted. If the pixel is neither a background pixel nor a reading pixel, the grayscale and any color value of the pixel may be kept unchanged.

In an embodiment, the grayscale of the each of the background pixels may be increased or decreased based on the random value in the preset range, by determining a set number of random values in the preset range.

Grayscales of background pixels of a current block may be changed based on the set number of random values, until grayscales of background pixels of all of the one or more blocks have been changed.

The random value may be set for each background pixel. For example, there may be a first background pixel, a second background pixel, . . . , and an Mth background pixel in the background. A first random value randomly determined for the first background pixel may be −1. A second random value randomly determined for the second background pixel may be −2, etc. An Mth random value randomly determined for the Mth background pixel may be 1. In this way, each background pixel may correspond to a random value. Then, grayscales of background pixels in a current block may be changed based on respective random values, until grayscales of all of the background pixels are changed. Compared to processing all background pixels in the whole picture simultaneously, in the embodiment, the background is divided into one or more blocks of a preset size, and grayscales of respective background pixels in each block are differentiated, respectively, reducing the amount of data to be processed simultaneously, thereby reducing a system load.

In an embodiment, the grayscales of the background pixels of the current block may be increased or decreased based on the set number of random values, by acquiring target Red, Green, and Blue (RGB) values corresponding to a reading scene based on current RGB values of the background pixels in the current block according to a set mapping relation.

A numerical value of each component in the target RGB values may be changed based on the set number of random values.

The target RGB values corresponding to the reading scene may be acquired based on the current RGB values of the background pixels in the current block according to the set mapping relation, by determining whether the current RGB values of the background pixels of the background correspond to preset RGB values of the reading scene. When the current RGB values of the background pixels of the background do not correspond to preset RGB values of the reading scene, the target RGB values corresponding to the reading scene may be acquired according to the set mapping relation. For example, acquired target RGB values may be lower than or higher than the current RGB values. The RGB values may include component values of different colors. That is, the current RGB values may include multiple current component values. Target RGB values may include multiple target component values. The preset RGB values may include multiple preset component values.

The preset RGB values corresponding to the reading scene may be preset. For example, when each background pixel in the background includes current component values of three colors, it may be determined respectively whether a current component value corresponds to a preset component value. When a current component value does not correspond to the preset component value, a target component value may be acquired.

For example, an acquired target component value of a first color may be lower than the current component value of the first color. An acquired target component value of a second color may be lower than the target component value of the first color. An acquired target component value of a third color may be lower than the target component value of the second color. When the first color is red, the second color is green, and the third color is blue, a blue light component may be reduced, rendering the background yellowish, thereby rendering the current background corresponding to the reading scene.

As another example, current RGB values of respective background pixels in the background may all be (255, 255, 255). That is, the current component value of the first color, the current component value of the second color, and the current component value of the third color of the background pixels may all be 255. Then, the background may be pure white. Since pure white does not correspond to the reading scene, target RGB values of respective background pixels may be acquired according to a preset mapping relation. For example, acquired target RGB values may be (206, 200, 190). That is, the target component value of the first color may be 206. The target component value of the second color may be 200. The target component value of the third color may be 190.

In addition to the component value of the first color, the component value of the second color, and the component value of the third color, a background pixel may further include the component value of a fourth color. The first color may be red. The second color may be green. The third color may be blue. The fourth color may be white. When a background pixel includes component values of four colors, the target component value of the first color, the target component value of the second color, the target component value of the third color, and the target component value of the fourth color may be acquired respectively.

After the target RGB values corresponding to the reading scene have been acquired, the target RGB values may be differentiated, allowing the background to produce an effect of diffuse reflection corresponding to the current reading scene. The target RGB values are acquired before grayscales of the background pixels are differentiated, improving reading experience by producing an effect of diffuse reflection.

In an embodiment, after the target RGB values corresponding to the reading scene have been acquired, component values in the target RGB values may be changed based on a random value. Component values of one background pixel may correspond to one random value.

In an embodiment, target component values of different colors in a single background pixel may be the target component value of the first color, the target component value of the second color, and the target component value of the third color, for example. Grayscales of the background pixels may be differentiated by randomizing the target component value of the first color, the target component value of the second color, and the target component value of the third color, respectively, acquiring differentiated target component values.

Again consider the example of the first background pixel in the background. When the first background pixel includes a first color channel, a second color channel, and a third color channel, the first target component value of the first color, the second target component value of the second color, and the third target component value of the third color may be determined, respectively. Then, a first random value for the first background pixel may be selected randomly from the preset range. After the first random value has been determined, a first sum of the first target component value and the first random value, a second sum of the second target component value and the first random value, and a third sum of the third target component value and the first random value may be computed. Differentiated target RGB values may be acquired according to the first sum, the second sum, and the third sum as determined. For example, when the first target component value of the first color is 206, the second target component value of the second color is 200, and the third target component value of the third color is 190, if the first random value is −1, then, a differentiated first target component value may be 205, the differentiated second target component value may be 199, and the differentiated third target component value may be 189, i.e., the differentiated target RGB values may be (205, 199, 189).

In an embodiment, differentiation processing may be performed on the background pixels by determining target component values of the target RGB values of a background pixel. The target component values may be randomized, to acquire differentiated target RGB values. Refining the differentiation to RGB values may produce a finer effect of display with diffuse reflection, improving reading experience.

In an embodiment, a sum of the set number of random values may be 0. The same number of background pixels may be changed with each random value. The sum of the set number of random values as determined may be 0, such that the acquired target RGB values may equal the average values of differentiated RGB values of background pixels in the current block.

In an embodiment, with each random value, one background pixel may be changed. Again consider the example of the first background pixel, and the target RGB values (206, 200, 190). If the first random value is −1, first differentiated RGB values may be (205, 199, 189). If a second random value is 1, second differentiated RGB values may be (207, 201, 191). A sum of the first random value and the second random value is 0. Average values of the first differentiated RGB values and the second differentiated RGB values may equal to the target RGB values.

In an embodiment, N background pixels may be changed with a random value, and N sets of target RGB values may be simultaneously changed with each random value. The N may be a positive integer. Again consider the example of the first background pixel, and target RGB values (206, 200, 190). If the first random value is −1, the first random value may correspond to N sets of first differentiated RGB values, all being (205, 199, 189). If the second random value is 1, the second random value may correspond to N sets of second differentiated RGB values, all being (207, 201, 191). The sum of the first random value and the second random value is 0. Average values of the N sets of first differentiated RGB values and the N sets of second differentiated RGB values may equal to the target RGB values.

In an embodiment, the sum of the set number of random values is made to be 0, so that the acquired target RGB values equal to averages of the differentiated RGB values of each background pixel in the current block, producing a finer effect of display with diffuse reflection, improving reading experience.

In an embodiment, the method may further include determining a grayscale distribution interval where each pixel in the display content is located. When a number of the grayscale distribution interval is less than a number threshold, it may be determined that the electronic equipment is in a reading scene. Grayscales of the background pixels of the background may be differentiated when the electronic equipment is in the reading scene.

In the embodiment, pixels in the display content may be located in different grayscale distribution intervals in different scenes. For example, when the display content includes a picture, text, and various types of information boxes at the same time, grayscales of pixels of each part in the display content may not be so simple, and may correspond to multiple grayscale distribution intervals. The number threshold may be 4. That is, it may be determined that the electronic equipment is in the reading scene when the number of the grayscale distribution intervals is less than 4.

For example, grayscales of pixels in the display content may be determined. A distinct grayscale distribution interval where the grayscale of each pixel is located may be determined, thereby acquiring different grayscale distribution intervals. That is, a fewer number of the grayscale distribution intervals may indicate a more concentrated distribution of grayscales of the pixels. The fewer types of display content may indicate that the scene is closer to the reading scene. A greater number of the grayscale distribution intervals may indicate a more scattered distribution of grayscales of the pixels. The more types of display content may indicate that the scene is more different from the reading scene.

In an embodiment, the method may further include: when the electronic equipment is in the reading scene, determining a grayscale distribution interval corresponding to a maximal number of pixels in the display content as a grayscale distribution interval where the background pixels in the display content are located.

For example, after determining that the electronic equipment is in the reading scene, background pixels may be determined. In the reading scene, as the background pixels of the background may occupy a large area, a grayscale distribution interval corresponding to a maximal number of pixels in the display content may be determined as a grayscale distribution interval where the background pixels are located. A grayscale distribution interval corresponding to a second maximal number of pixels in the display content may be determined as a grayscale distribution interval where the reading pixels in the display content are located. Here, it is determined whether the current scene is the reading scene according to the number of the grayscale distribution intervals. The background pixels in the display content are determined. The scene and the display content are recognized based on cluster analysis, rendering smarter background pixel processing.

In an embodiment, the method may further include: adjusting RGB values of reading pixels of the object for reading. The object for reading may include a picture and/or text. For example, the object for reading may be text. During background pixels differentiation, as there is a change in grayscales of the background, RGB values of the reading pixels of the object for reading displayed on the background may have to be adjusted as well, to make sure that the adjusted RGB values correspond to the background pixels with the differentiated grayscales. For example, before background pixels differentiation, the RGB values of the object for reading may be (80, 75, 70). After background pixels differentiation, the RGB values of the object for reading may be adjusted from (80, 75, 70) to (58, 64, 64), randomly.

After background pixels differentiation, the RGB values of the reading pixels of the object for reading may be adjusted adaptively, better matching a color of the object for reading to the background having been subject to differentiation processing, rendering the whole picture displayed by the electronic equipment more realistic and natural, thereby improving reading experience of the user.

After the RGB values of the reading pixels of the object for reading have been adjusted, differentiation processing similar to that on the grayscales of the background pixels of the background may be performed on the adjusted RGB values, to acquire the object for reading and the background having been subject to differentiation processing. In this way, the color of the object for reading may be made closer to an ink color on a paper page, while allowing both the background and the object for reading to present an effect of display with diffusion reflection.

In an embodiment, the RGB values of the reading pixels of the object for reading may be adjusted as follows. Both grayscales of background pixels of the background and grayscales of reading pixels of the object for reading that is located on the background may be differentiated simultaneously. Color values of the reading pixels having been subject to differentiation processing may be adjusted. Compared to performing differentiation processing on the background and then performing color adjustment and differentiation processing on the object for reading, the color values of the object for reading are adjusted after unified differentiation processing has been performed on the background and the object for reading in the embodiment, reducing a number of steps in pixel processing, and improving processing efficiency.

In an embodiment, the method may further include: adjusting the RGB values of the reading pixels based on the background pixels with differentiated grayscales, thereby adjusting a contrast between the background and the object for reading.

After differentiation processing has been performed on the background, the background may present an effect of display with diffusion reflection. After the effect of display with diffusion reflection has been achieved, a contrast between the background and the object for reading may be adjusted by adjusting the RGB values of the reading pixels. The contrast between the background and the object for reading may be computed based on ratios of differentiated grayscales to grayscales of the object for reading. For example, if a differentiated grayscale of the background pixel is 160, and a grayscale of the object for reading is 64, the contrast between the background having been subject to differentiation processing and the object for reading may be 5:1. The method may further include: when differentiation processing has been performed on the background and the object for reading simultaneously, the contrast between the background and the object for reading may be adjusted by adjusting differentiated grayscales of the reading pixels and/or differentiated grayscales of the background pixels.

After an effect of diffuse reflection has been achieved by performing differentiation processing on the background, the contrast between the background having been subject to differentiation processing and the object for reading may further be adjusted by adjusting the RGB values of the reading pixels, rendering color brightness between the background and the object for reading more coordinated.

In an embodiment, the method may further include acquiring a light parameter of an environment where the display assembly is located. The light parameter may include at least a color temperature and a brightness. Chromatic adaptation transform may be performed on the color of the object for reading and the background based on the light parameter using a color transform mechanism.

The color transform mechanism may include a von Kries transform model, a linear Bradford transform model, etc. For example, the color transform mechanism may be the von Kries transform model. In an implementation, tristimulus values of the background and the object for reading in a current environment may be acquired. The tristimulus values of the background and the object for reading may be transformed into cone response tristimulus values based on a preset transform matrix. The cone response tristimulus values may be adjusted according to the light parameter. The adjusted cone response tristimulus values may be transformed into tristimulus values of the background and the object for reading in a target environment, thereby implementing a chromatic adaptation transform of the object for reading and the background. In color matching, three colors for generating any color by color mixing may be referred to as three primary colors. The amount of the three primary colors required to match a color under test may be referred to as tristimulus values.

In an embodiment, under the color temperature and brightness of different ambient light, chromatic adaptation transform may be performed on the color of the object for reading and the background based on the light parameter using a color transform mechanism, rendering the background and the object for reading that are displayed in the end more natural.

In the related art, the color of the background displayed on the display assembly of the electronic equipment is unified. That is, the RGB values of the background pixels at different locations in the background are the same. In such a case, the display assembly may produce a mirror reflection effect, leading to a poor reading experience. In the embodiments, differentiation processing may be performed on the background, rendering each background pixel in the background appearing substantially the same, yet slightly paper-like yellowish, plus rendering the RGB values of adjacent background pixels slightly different, simulating an effect of diffuse reflection.

In an embodiment, the target RGB values corresponding to the reading scene may be acquired first. A target RGB value may be within a random preset range. For example, the current RGB values of each background pixel in the background may be (255, 255, 255). That is, the current component value of the first color, the current component value of the second color, and the current component value of the third color of the background pixel are all 255. In this case, the background may be pure white. As pure white does not correspond to the reading scene, the target RGB values corresponding to the reading scene may be acquired according to the set mapping relation. For example, the acquired target RGB values may be (206, 200, 190).

After the target RGB values corresponding to the reading scene have been acquired, the target RGB values may be differentiated, allowing the background to produce an effect of diffuse reflection corresponding to the current reading scene. For example, a random value may be randomly selected from the preset range. A sum of a target RGB value and the random value determined randomly may be computed, acquiring differentiated target RGB values. The preset range may be a data range no less than −6 and no greater than 6. Each component value of the same background pixel may correspond to the same random value.

In an embodiment, a ratio of different colors may be selected according to the display component, achieving a comfortable color range. Different colors may include red, green, and blue. For example, if the RGB values of the background pixels are (206, 200, 190), the background pixels may be displayed on a display of a color temperature 7,300 kelvins (K), with a color temperature around 6,500K, a white point visual range comfortable to human eyes.

In an embodiment, multiple random values in the preset range may be set. A preset random sequence may be formed based on the multiple random values. The number of the random values may be set as needed. For example, the size of the background of the picture may be 64×64, i.e., corresponding to 4,096 background pixels. Taking the first 22 background pixels in the 64×64 background as an example, originally current RGB values of each background pixel may be (255, 255, 255). Then, target RGB values (206, 200, 190) may be acquired. The target RGB values may then be adjusted according to the random values.

Figure 3:
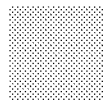
FIG. 3 is a diagram of a background with differentiated target RGB values according to an exemplary embodiment.

FIG. 2 is a diagram of computing differentiated target RGB values according to an exemplary embodiment. As shown in FIG. 2, the target RGB values are (206, 200, 190). In the first column, the target RGB values adjusted based on the random value −1 are (205, 199, 189). The random values in the third column and the fourth column are 0, and the target RGB values are kept unchanged, etc. In the 22nd column, the target RGB values adjusted based on the random value 4 are (210, 204, 194). FIG. 3 is a diagram of a background with differentiated target RGB values according to an exemplary embodiment.

In an embodiment, the target RGB values may also be differentiated based on a dither algorithm. First, the picture displayed on the display assembly may be divided into 64×64 blocks. Pixels in each block may be scanned one by one to determine whether a pixel is a background pixel. When the pixel is a background pixel, the target RGB values of the pixel may be differentiated to be RGB values computed based on the dither algorithm. When the pixel is not a background pixel, it may be determined whether the pixel is a reading pixel. If the pixel is a reading pixel, a color value of the pixel may be adjusted. If the pixel is neither a background pixel nor a reading pixel, the RGB values and the color value of the pixel may be kept unchanged.

Figure 4:
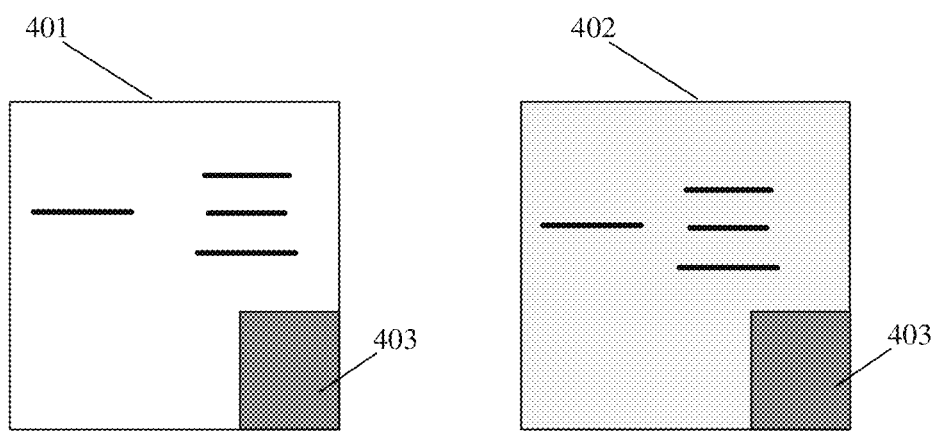
FIG. 4 is a diagram of a display interface according to an exemplary embodiment.

For example, assume that the RGB values of each background pixel in the 64×64 block are (255, 255, 255), the RGB values of the reading pixels of the object for reading are (0, 0, 0), and there is a red pixel in a range from coordinates (45, 40) to (64, 64). Then, during differentiation, the RGB values of the background pixels may be differentiated to be RGB values computed based on the dither algorithm. The color values of the reading pixels of the object for reading may be adjusted. The red part may be kept unchanged. In implementation, the color of the object for reading may be adjusted to the ink color. Compared to differentiating the RGB values based on the dither algorithm, it is simpler to differentiate the RGB values through random values. FIG. 4 is a diagram of a display interface according to an exemplary embodiment. As shown in FIG. 4, a part 403 corresponding to red is kept unchanged in a display interface 402 with background pixels having been subject to differentiation processing and in a display interface 401 with background pixels before the differentiation processing.

Figure 5:
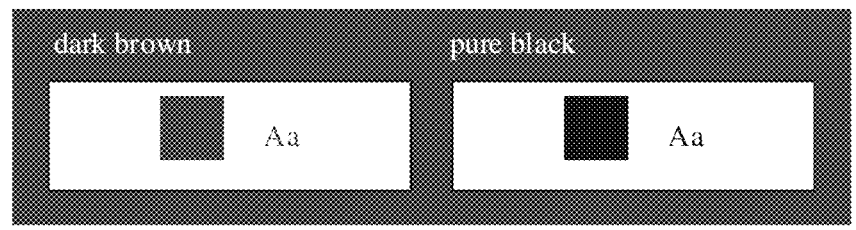
FIG. 5 is a diagram of a display effect of displaying an object for reading according to an exemplary embodiment.

In an embodiment, when differentiation processing is performed on the background pixels, the target RGB values of the background are changed. In this case, the color values of the reading pixels of the object for reading that is displayed on the background may be adjusted, to ensure that the adjusted color values correspond to the background pixels with the differentiated grayscales. For example, a color print may be printed using a CMYK color system, with an ink color that is not pure black but closer to dark brown. The letters CMYK represent cyan, magenta, yellow and black, respectively. The reading pixels on the display assembly of the electronic equipment may be processed by adjusting a color value of a font. For example, the RGB values of the object for reading may be adjusted from (80, 75, 70) to (58, 64, 64), thus achieving an effect closer to ink. FIG. 5 is a diagram of a display effect of displaying an object for reading according to an exemplary embodiment. In FIG. 5, the left part corresponds to dark brown, and the right part corresponds to pure black. The dark brown is closer to the effect of ink.

In an embodiment, the background may be recognized using a surface flinger layer of a processor according to a principle of an application corresponding to the application interface currently displayed on the electronic equipment. Differentiation processing may be performed on the background. Then, subsequent layer synthesis may be performed on the object for reading and the background having been subject to differentiation processing.

In an embodiment, as the color of the background may be simple in the reading scene, pixels corresponding to a grayscale occurring most frequently may be determined as background pixels of the background. Pixels corresponding to a grayscale occurring the second most frequently may be determined as reading pixels. The display content may be analyzed based on the processor of the electronic equipment and an integrated circuit of the display, acquiring the grayscales of the background and the object for reading in the current display content, thereby recognizing the reading scene.

Figure 6A:
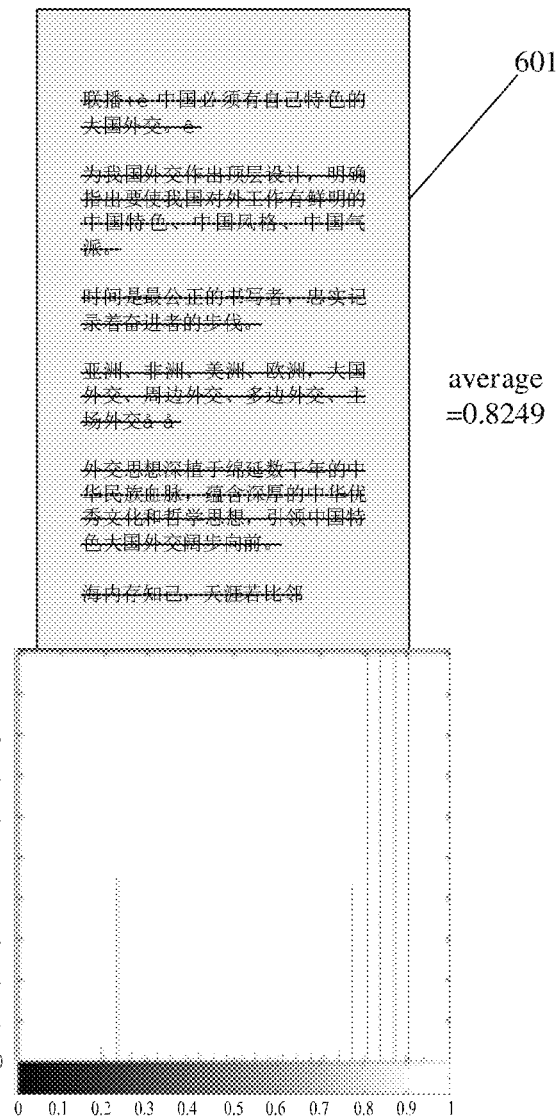
FIG. 6A is a diagram of a display interface of a first scene according to an exemplary embodiment.
Figure 6B:
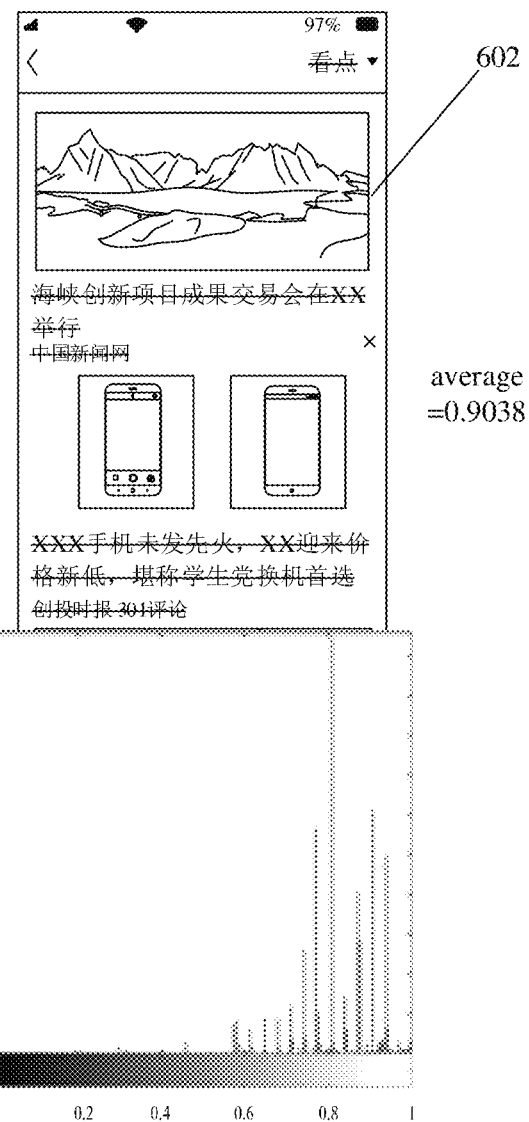
FIG. 6B is a diagram of a display interface of a second scene according to an exemplary embodiment.
Figure 6C:
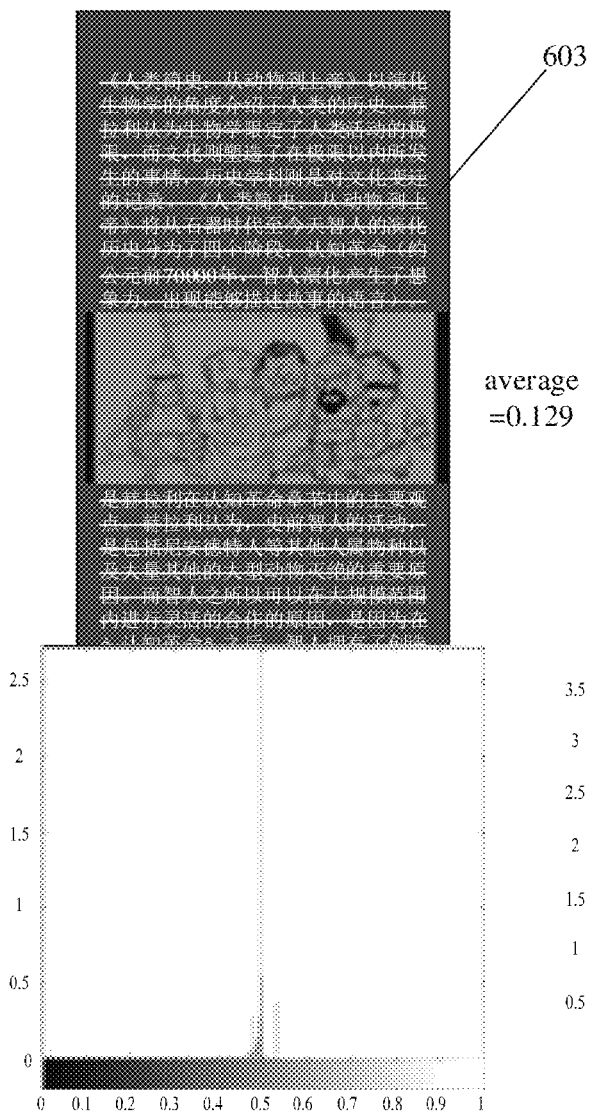
FIG. 6C is a diagram of a display interface of a third scene according to an exemplary embodiment.
Figure 6D:
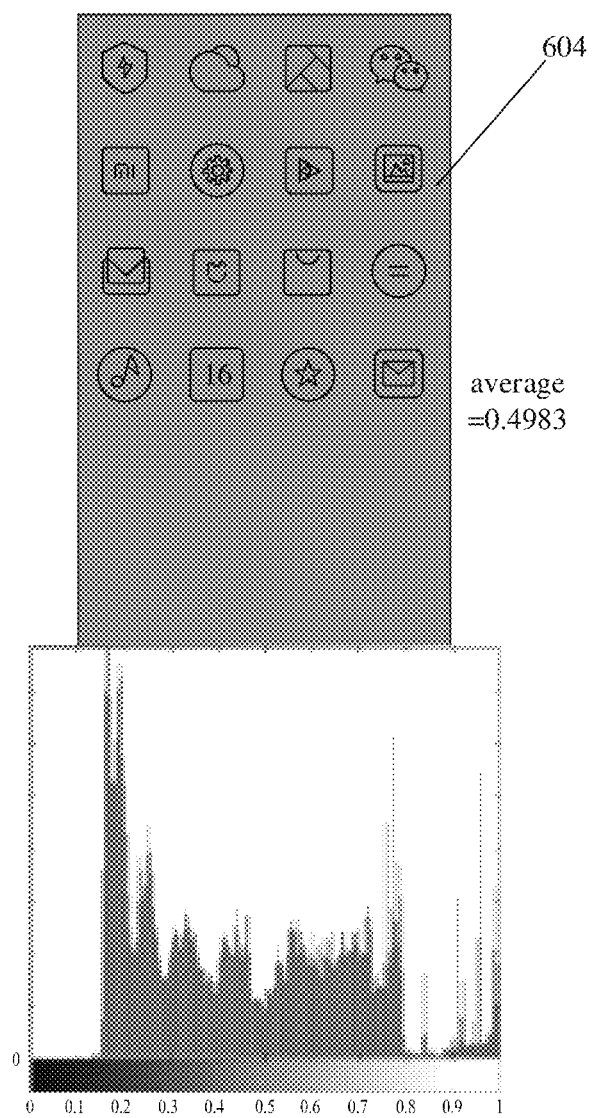
FIG. 6D is a diagram of a display interface of a fourth scene according to an exemplary embodiment.

FIG. 6A is a diagram of a display interface of a first scene according to an exemplary embodiment. FIG. 6B is a diagram of a display interface of a second scene according to an exemplary embodiment. FIG. 6C is a diagram of a display interface of a third scene according to an exemplary embodiment. FIG. 6D is a diagram of a display interface of a fourth scene according to an exemplary embodiment. As shown in FIG. 6A to FIG. 6D, in the first scene to the fourth scene, the display interface displays Chinese text or icons, and below each display interface there is a histogram of distribution of grayscales of the display interface (i.e., a table counting occurrences of each grayscale) acquired by the processor of the electronic equipment. Grayscales of the first display interface 601 and of the third display interface 603 are relatively simple. It may be determined that the first display interface 601 and the third display interface 603 involve typical reading scenes. The second display interface 602 and the fourth display interface 604 have no such feature. It may be determined that the second display interface 602 and the fourth display interface 604 involve no reading scene.

It is reflected light that enters eyes of a reader. Accordingly, the color seen may change with ambient light. In chromatics, color appearance may be defined as follows. When International Commission on Illumination (CIE) tristimulus values of two colors are the same, visual perceptions of the two colors by the retina of a human eye may be the same. However, visual perceptions of two identical colors may be the same only when observed under the condition of the same ambient condition, the same background, the same sample size, the same sample shape, the same surface characteristics, the same lighting, etc. A hue, brightness, and saturation of a sample may change with an environmental factor such as lighting.

Figure 7:
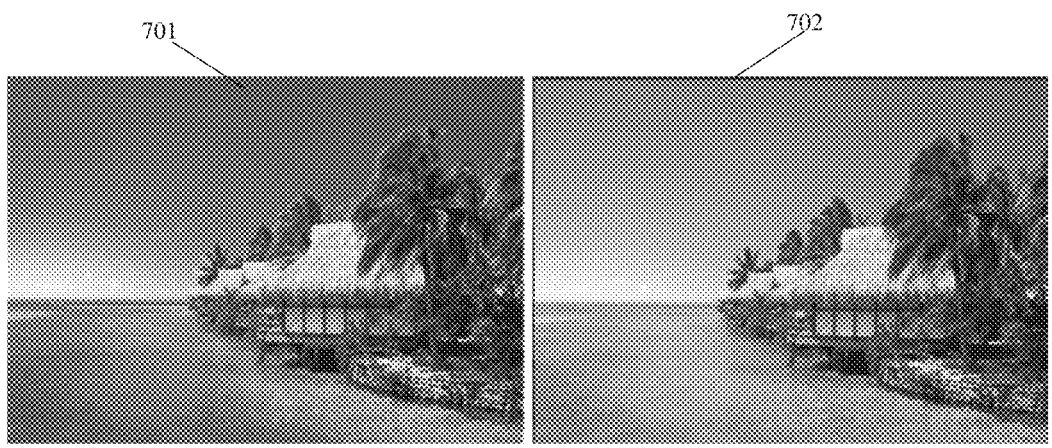
FIG. 7 is a diagram of comparing display interfaces according to an exemplary embodiment.

Therefore, under the color temperature and brightness of different ambient light, color appearance matching, i.e., chromatic adaptation change, may need to be performed on a displayed color. FIG. 7 is a diagram of comparing display interfaces according to an exemplary embodiment. In FIG. 7, for the picture in a display interface 701, only the color temperature of the display is changed, and no other chromatic adaptation change is made. Compared to the display interface 701, for the picture in a display interface 702, a chromatic adaptation change is made, rendering the display interface 702 more natural, matching a visual effect of light reflected by a print when the ambient light switches to a warm tone. In the embodiment, under the different color temperatures and brightness of different ambient light, chromatic adaptation transform may be performed on the color of the object for reading and the background based on the light parameter using a color transform mechanism, rendering the background and the object for reading that are displayed in the end more natural.

Figure 8A:
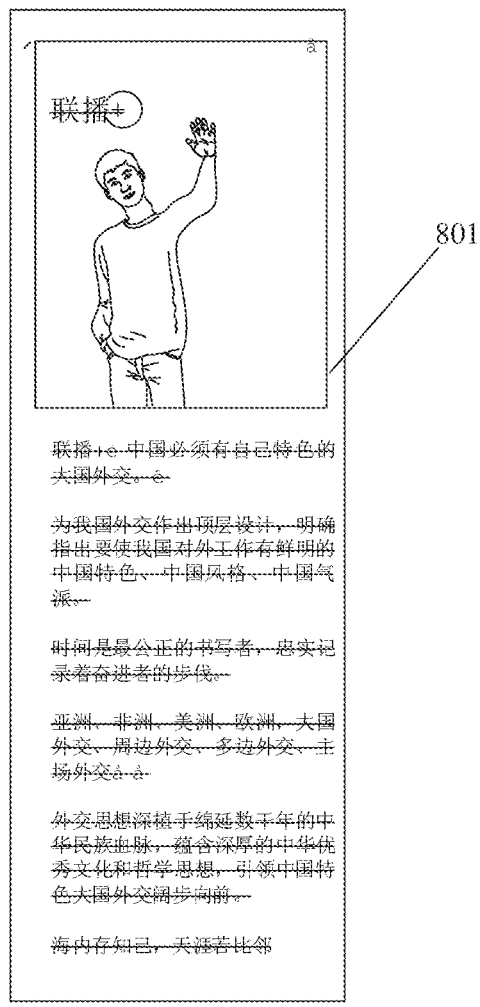
FIG. 8A is a diagram of a first display interface according to an exemplary embodiment.
Figure 8B:
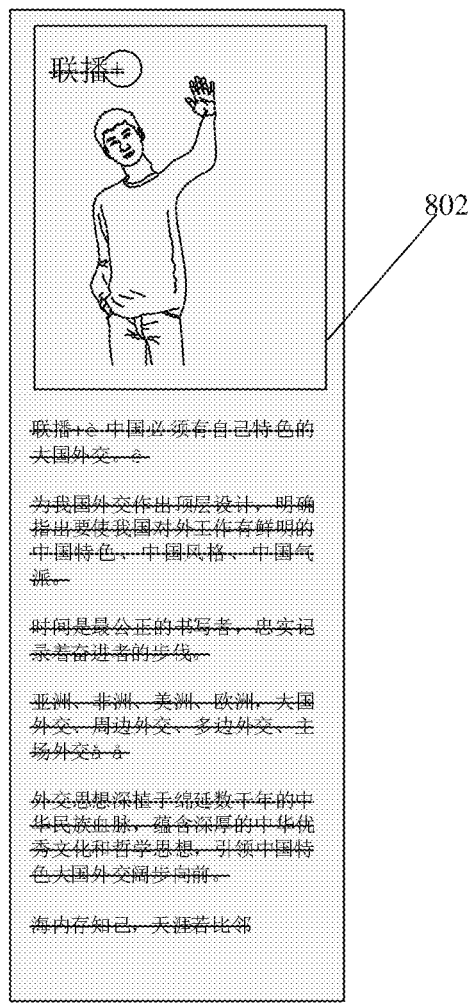
FIG. 8B is a diagram of a second display interface according to an exemplary embodiment.
Figure 8C:
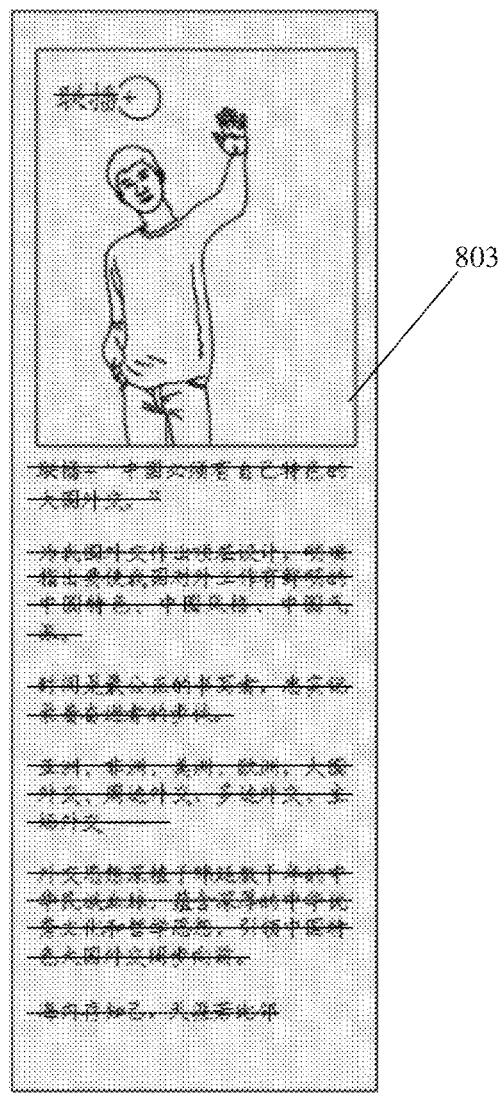
FIG. 8C is a diagram of a third display interface according to an exemplary embodiment.

FIG. 8A is a diagram of a first display interface according to an exemplary embodiment. FIG. 8B is a diagram of a second display interface according to an exemplary embodiment. FIG. 8C is a diagram of a third display interface according to an exemplary embodiment. As shown in FIG. 8A to FIG. 8C, compared to a display interface 801 of an original picture with Chinese text, the background of a display interface 802 in an eye protection mode may be displayed in a dark color, while presenting an effect of mirror reflection. The background in a display interface 803, which has been subject to differentiation processing, is displayed in a more natural color, as well as achieving an effect of display with diffusion reflection. In the embodiments, differentiation processing may be performed on the background, rendering each background pixel in the background appearing substantially the same, yet slightly paper-like yellowish, plus rendering the RGB values of adjacent background pixels slightly different, simulating an effect of diffuse reflection.

Figure 9:
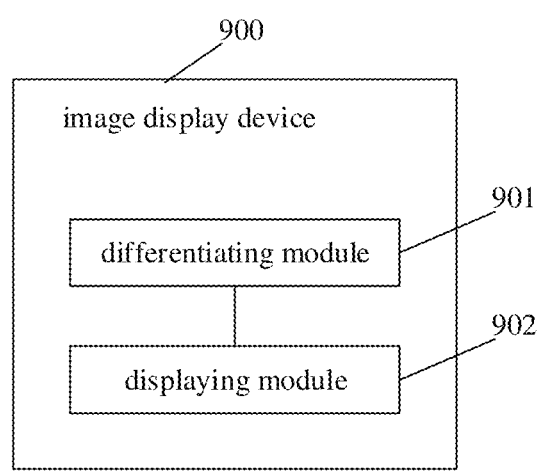
FIG. 9 is a block diagram of a display device according to an exemplary embodiment.

FIG. 9 is a block diagram of a display device 900 according to an exemplary embodiment. The device 900 may be applied to electronic equipment including a display assembly. A display content displayed by the display assembly includes a background and an object for reading located on the background. As shown in FIG. 9, the device 900 includes a differentiating module 901 and a displaying module 902.

The differentiating module 901 is configured to differentiate grayscales of background pixels of the background.

The displaying module 902 is configured to display the background based on the background pixels with differentiated grayscales, and display the object for reading.

The differentiating module 901 may be further configured to increase or decrease a grayscale of each of the background pixels based on a random value in a preset range.

The differentiating module 901 may be further configured to: divide the background into one or more blocks of a preset size, and differentiate grayscales of background pixels of each of the one or more blocks, until grayscales of all of the background pixels in the background have been differentiated.

The differentiating module 901 may be further configured to: determine a set number of random values in the preset range; and change grayscales of background pixels of a current block based on the set number of random values, until grayscales of background pixels of all of the one or more blocks have been changed.

The differentiating module 901 may be further configured to: acquire target Red, Green, and Blue (RGB) values corresponding to a reading scene based on current RGB values of the background pixels in the current block according to a set mapping relation; and change a numerical value of each component in the target RGB values based on the set number of random values.

A sum of the set number of random numbers may be 0.

The device 900 may further include a first determining module and a second determining module. The first determining module may be configured to determine a grayscale distribution interval where each pixel in the display content is located. The second determining module may be configured to, in response to a number of the grayscale distribution interval being less than a number threshold, determine that the electronic equipment is in a reading scene.

The differentiating module 901 may be further configured to, in response to the electronic equipment being in the reading scene, differentiate the grayscales of the background pixels of the background.

The device 900 may further include a third determining module. The third determining module may be configured to, in response to the electronic equipment being in the reading scene, determine a grayscale distribution interval corresponding to a maximal number of pixels in the display content as a grayscale distribution interval where the background pixels in the display content are located.

The device 900 may further include an adjusting module. The adjusting module may be configured to adjust RGB values of reading pixels of the object for reading. The adjusting module may be further configured to adjust the RGB values of the reading pixels based on the background pixels with the differentiated grayscales, thereby adjusting a contrast between the background and the object for reading.

The device 900 may further include an acquiring module and a transforming module. The acquiring module may be configured to acquire a light parameter of an environment where the display assembly is located. The light parameter may include at least a color temperature and a brightness. The transforming module may be configured to perform chromatic adaptation transform on the display content displayed by the display assembly based on the light parameter using a color transform mechanism.

Figure 10:
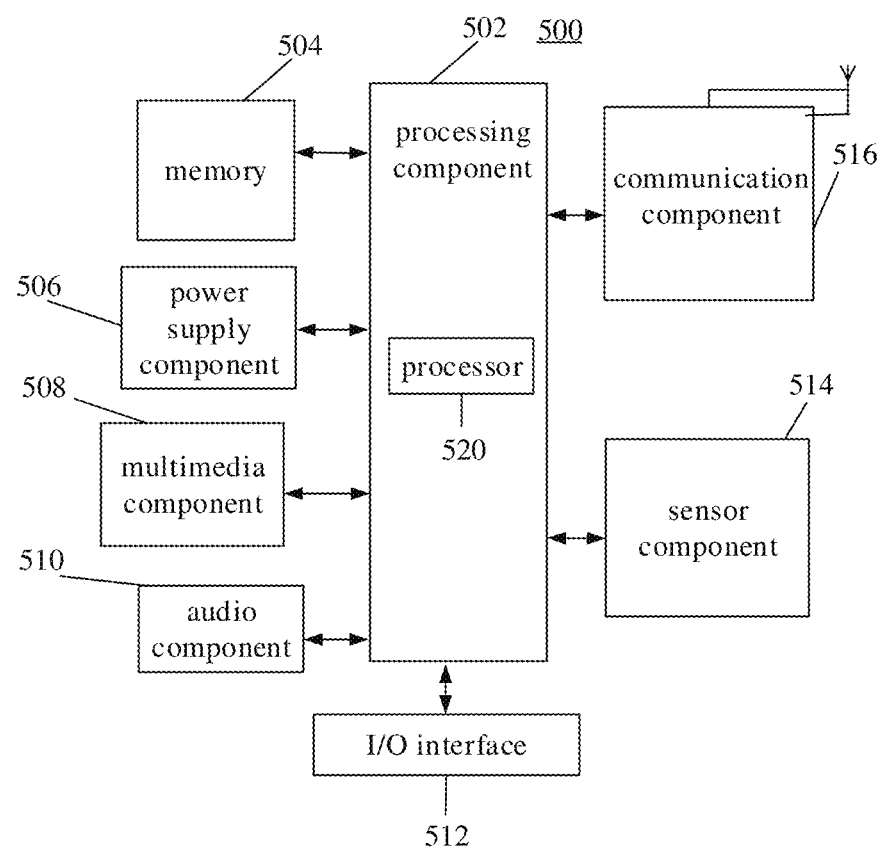
FIG. 10 is a block diagram of a display device according to an exemplary embodiment.

FIG. 10 is a block diagram of a device 500 according to an exemplary embodiment. For example, the device 500 may be a mobile phone, a computer, digital broadcasting equipment, a message transceiver, a game console, tablet equipment, medical equipment, fitness equipment, a personal digital assistant, etc.

Referring to FIG. 10, the device 500 may include at least one of a processing component 502, memory 504, a power supply component 506, a multimedia component 508, an audio component 510, an Input/Output (I/O) interface 512, a sensor component 514, or a communication component 516.

The processing component 502 may generally control an overall operation of the device 500, such as operations associated with display, a telephone call, data communication, a camera operation, a recording operation, etc. The processing component 502 may include one or more processors 520 to execute instructions so as to complete all or part of the options of an aforementioned method. In addition, the processing component 502 may include one or more modules to facilitate interaction between the processing component 502 and other components. For example, the processing component 502 may include a multimedia module to facilitate interaction between the multimedia component 508 and the processing component 502.

The memory 504 may be configured to store various types of data to support the operation at the device 500. Examples of such data may include instructions of an application or method configured to operate on the device 500, contact data, phonebook data, messages, pictures, videos, etc. The memory 504 may be realized by any type of transitory or non-transitory storage equipment or a combination thereof, such as Static Random Access Memory (SRAM), Electrically Erasable Programmable Read-Only Memory (EE-PROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 506 may supply electric power to various components of the device 500. The power supply component 506 may include a power management system, one or more power sources, and other components related to generating, managing, and distributing electricity for the device 500.

The multimedia component 508 may include a screen that provides an output interface between the device 500 and a user. The screen may include a Liquid Crystal Display (LCD) and a Touch Panel (TP). If the screen may include a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 508 may include at least one of a front camera or a rear camera. When the device 500 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 510 may be configured to output and/or input an audio signal. For example, the audio component 510 may include a microphone (MIC). When the device 500 is in an operation mode such as a call mode, a recording mode, a voice recognition mode, etc., the MIC may be configured to receive an external audio signal. The received audio signal may be further stored in the memory 504 or may be sent via the communication component 516. The audio component 510 may further include a loudspeaker configured to output the audio signal.

The I/O interface 512 may provide an interface between the processing component 502 and a peripheral interface module. Such a peripheral interface module may be a keypad, a click wheel, a button, etc. Such a button may include but is not limited to at least one of a homepage button, a volume button, a start button, or a lock button.

The sensor component 514 may include one or more sensors for assessing various states of the device 500. For example, the sensor component 514 may detect an on/off state of the device 500 and relative location of components such as the display and the keypad of the device 500. The sensor component 514 may further detect a change in the location of the device 500 or of a component of the device 500, whether there is contact between the device 500 and a user, the orientation or acceleration/deceleration of the device 500, a change in the temperature of the device 500, etc. The sensor component 514 may include a proximity sensor configured to detect existence of a nearby object without physical contact. The sensor component 514 may further include an optical sensor such as a Complementary Metal-Oxide-Semiconductor (CMOS) or a Charge-Coupled-Device (CCD) image sensor used in an imaging application. The sensor component 514 may further include an acceleration sensor, a gyroscope sensor, a magnetic sensor, a pressure sensor, a temperature sensor, etc.

The communication component 516 may be configured to facilitate wired or wireless communication between the device 500 and other equipment. The device 500 may access a wireless network based on a communication standard such as Wi-Fi, 4G, 5G, or a combination thereof. The communication component 516 may broadcast related information or receive a broadcast signal from an external broadcast management system via a broadcast channel. The communication component 516 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The device 500 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement an aforementioned method.

Embodiments of the present disclosure also provide a non-transitory computer-readable storage medium including instructions, such as the memory 504 including instructions. The instructions may be executed by the processor 520 of the device 500 to perform the methods described above. For example, the computer-readable storage medium may be Read-Only Memory (ROM), Random Access Memory (RAM), Compact Disc Read-Only Memory (CD-ROM), a magnetic tape, a floppy disk, optical data storage equipment, etc.

Other embodiments of the disclosure will be apparent to one skilled in the art after consideration of the disclosure and practice of the embodiments. This application is intended to cover any variation, use, or adaptation of the disclosure following the general principle of the disclosure and including such departures from the disclosure as come within known or customary practice in the art. The embodiments are exemplary only, with a true scope and spirit of the subject disclosure being indicated by the appended claims.

The disclosure is not limited to the exact construction that has been described above and illustrated in the accompanying drawings. Various modifications and changes can be made without departing from the scope of the disclosure. It is intended that the scope of the disclosure is limited only by the appended claims.

What is claimed is:

1. A display method applied to electronic equipment including a display assembly, a display content displayed by the display assembly including a background and an object for reading located on the background, the display method comprising:
   differentiating grayscales of background pixels of the background, wherein differentiating the grayscales comprises: in response to a number of background pixels with identical grayscales being no less than a set number threshold, acquiring the background pixels with differentiated grayscales by performing randomization processing on the background pixels with the identical grayscales, thereby rendering the grayscales of the background pixels different from each other to simulate an effect of diffuse reflection by a paper book; and
   displaying the background based on the background pixels with the differentiated grayscales, and displaying the object for reading.

2. The display method of claim 1, wherein differentiating the grayscales of the background pixels of the background comprises:
   increasing or decreasing a grayscale of each of the background pixels based on a random value in a preset range.

3. The display method of claim 2, wherein differentiating the grayscales of the background pixels comprises:
   dividing the background into one or more blocks of a preset size, and differentiating grayscales of background pixels of each of the one or more blocks, until grayscales of all of the background pixels in the background have been differentiated.

4. The display method of claim 3, wherein increasing or decreasing the grayscale of each of the background pixels based on the random value in the preset range comprises:
   determining a set number of random values in the preset range; and
   changing grayscales of background pixels with identical grayscales of a current block based on the set number of random values, until grayscales of background pixels of all of the one or more blocks have been differentiated.

5. The display method of claim 4, wherein increasing or decreasing the grayscales of the background pixels with identical grayscales of the current block based on the set number of random values comprises:
   acquiring target red, green, and blue (RGB) values corresponding to a reading scene based on current RGB values of the background pixels in the current block according to a set mapping relation; and
   changing a numerical value of each component in the target RGB values based on the set number of random values.

6. The display method of claim 4, wherein a sum of the set number of random values is 0.

7. The display method of claim 1, further comprising:
   determining a grayscale distribution interval where each pixel in the display content is located; and
   in response to a number of grayscale distribution intervals being less than a number threshold, determining that the electronic equipment is in a reading scene,
   wherein differentiating the grayscales of the background pixels of the background comprises:
   in response to the electronic equipment being in the reading scene, differentiating the grayscales of the background pixels of the background.

8. The display method of claim 7, further comprising:
   in response to the electronic equipment being in the reading scene, determining a grayscale distribution interval corresponding to a maximal number of pixels in the display content as a grayscale distribution interval where the background pixels in the display content are located.

9. The display method of claim 1, further comprising:
   adjusting RGB values of reading pixels of the object for reading.

10. The display method of claim 9, wherein adjusting the RGB values of the reading pixels of the object for reading comprises:
    adjusting the RGB values of the reading pixels based on the background pixels with the differentiated grayscales, thereby adjusting a contrast between the background and the object for reading.

11. The display method of claim 1, further comprising:
    acquiring a light parameter of an environment where the display assembly is located, the light parameter comprising at least a color temperature and a brightness; and
    performing a chromatic adaptation transform on the display content displayed by the display assembly based on the light parameter using a color transform mechanism.

12. Electronic equipment, comprising:
    a processor;
    a memory configured to store instructions executable by the processor; and
    a display assembly,
    wherein a display content displayed by the display assembly includes a background and an object for reading located on the background; and
    the processor is configured to:
    differentiate grayscales of background pixels of the background, wherein differentiating the grayscales comprises: in response to a number of background pixels with identical grayscales being no less than a set number threshold, acquiring the background pixels with differentiated grayscales by performing randomization processing on the background pixels with the identical grayscales, thereby rendering the grayscales of the background pixels different from each other to simulate an effect of diffuse reflection by a paper book; and
    display the background based on the background pixels with the differentiated grayscales, and display the object for reading.

13. The electronic equipment of claim 12, wherein in differentiating the grayscales of the background pixels of the background, the processor is further configured to:
    increase or decrease a grayscale of each of the background pixels based on a random value in a preset range.

14. The electronic equipment of claim 13, wherein in differentiating the grayscales of the background pixels of the background, the processor is further configured to:
    divide the background into one or more blocks of a preset size, and differentiate grayscales of background pixels of each of the one or more blocks, until grayscales of all of the background pixels in the background have been differentiated.

15. The electronic equipment of claim 12, wherein the processor is further configured to:
    determine a grayscale distribution interval where each pixel in the display content is located;
    in response to a number of grayscale distribution intervals being less than a number threshold, determine that the electronic equipment is in a reading scene; and
    in response to the electronic equipment being in the reading scene, differentiate the grayscales of the background pixels of the background.

16. The electronic equipment of claim 15, wherein the processor is further configured to:
    in response to the electronic equipment being in the reading scene, determining a grayscale distribution interval corresponding to a maximal number of pixels in the display content as a grayscale distribution interval where the background pixels in the display content are located.

17. The electronic equipment of claim 12, wherein the processor is further configured to:
    adjust RGB values of reading pixels of the object for reading.

18. The electronic equipment of claim 17, wherein in adjusting the RGB values of the reading pixels of the object for reading, the processor is further configured to:
    adjust the RGB values of the reading pixels based on the background pixels with the differentiated grayscales, thereby adjusting a contrast between the background and the object for reading.

19. The electronic equipment of claim 12, wherein the processor is further configured to:

acquire a light parameter of an environment where the display assembly is located, the light parameter comprising at least a color temperature and a brightness; and perform a chromatic adaptation transform on the display content displayed by the display assembly based on the light parameter using a color transform mechanism.

20. A non-transitory computer-readable storage medium having stored therein instructions that, when executed by a processor of electronic equipment including a display assembly, cause the electronic equipment to perform a display method, a display content displayed by the display assembly including a background and an object for reading located on the background, the display method comprising:

differentiating grayscales of background pixels of the background, wherein differentiating the grayscales comprises: in response to a number of background pixels with identical grayscales being no less than a set number threshold, acquiring the background pixels with differentiated grayscales by performing randomization processing on the background pixels with the identical grayscales, thereby rendering the grayscales of the background pixels different from each other to simulate an effect of diffuse reflection by a paper book; and displaying the background based on the background pixels with the differentiated grayscales, and displaying the object for reading.

* * * * *